United States Patent
Kim

(10) Patent No.: US 11,119,634 B2
(45) Date of Patent: Sep. 14, 2021

(54) APPARATUS AND METHOD FOR PROVIDING USER INTERFACE FOR PLATOONING OF VEHICLE

(71) Applicants: Hyundai Motor Company, Seoul (KR); Kia Motors Corporation, Seoul (KR)

(72) Inventor: Sang Jun Kim, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 16/513,354

(22) Filed: Jul. 16, 2019

(65) Prior Publication Data

US 2020/0183546 A1 Jun. 11, 2020

(30) Foreign Application Priority Data

Dec. 7, 2018 (KR) .......................... 10-2018-0157067

(51) Int. Cl.
| | |
|---|---|
| *G06F 3/0482* | (2013.01) |
| *G08G 1/00* | (2006.01) |
| *G06F 3/0488* | (2013.01) |
| *G06F 3/0485* | (2013.01) |
| *B60W 50/10* | (2012.01) |

(52) U.S. Cl.
CPC .......... *G06F 3/0482* (2013.01); *G06F 3/0485* (2013.01); *G06F 3/04883* (2013.01); *G08G 1/22* (2013.01); *B60W 50/10* (2013.01); *B60W 2556/65* (2020.02); *G06F 2203/04806* (2013.01); *G06F 2203/04808* (2013.01)

(58) Field of Classification Search
CPC ........ G05D 1/02; B60W 30/16; G06F 3/0482; G06F 3/0485; G06F 3/04883
See application file for complete search history.

(56) References Cited

U.S. PATENT DOCUMENTS

| | | | |
|---|---|---|---|
| 9,645,579 B2 * | 5/2017 | Switkes | B60W 30/165 |
| 2018/0032086 A1 * | 2/2018 | Punithan | G05D 1/0295 |
| 2019/0079659 A1 * | 3/2019 | Adenwala | H04W 4/026 |
| 2019/0086914 A1 * | 3/2019 | Yen | G05D 1/0212 |
| 2019/0220037 A1 * | 7/2019 | Vladimerou | G05D 1/0088 |
| 2020/0062270 A1 * | 2/2020 | Park | B60W 20/50 |
| 2020/0349850 A1 * | 11/2020 | Park | G08G 1/22 |

* cited by examiner

*Primary Examiner* — Cao H Nguyen
(74) *Attorney, Agent, or Firm* — Morgan, Lewis & Bockius LLP

(57) ABSTRACT

A user interface providing apparatus configured for platooning of a vehicle may include a touch screen display, a sensor detecting an external object of the vehicle, a communication circuit communicating with an outside, and a control circuit electrically connected to the touch screen display and the sensor. The control circuit is configured to display a first object corresponding to the vehicle and a second object corresponding to an external vehicle detected by the sensor, on the touch screen display, to receive a touch input associated with the second object, using the touch screen display, and to make a request for joining in a platooning group, to the external vehicle via the communication circuit in a response to the touch input.

16 Claims, 8 Drawing Sheets

APPARATUS AND METHOD FOR PROVIDING USER INTERFACE FOR PLATOONING OF VEHICLE

CROSS-REFERENCE TO RELATED APPLICATION

The present application claims priority to Korean Patent Application No. 10-2018-0157067, filed on Dec. 7, 2018, the entire contents of which is incorporated herein for all purposes by this reference.

BACKGROUND OF THE INVENTION

Field of the Invention

The present invention relates to a system, apparatus, and method for providing a user interface for platooning.

Description of Related Art

Platooning is a technology that performs autonomous driving in a state where a plurality of vehicles are arranged in a row at specified intervals. While performing platooning, a leading vehicle, which is the foremost vehicle in the platooning row, may control one or more following vehicles following the leading vehicle. The leading vehicle may maintain the interval between a plurality of vehicles included in the platooning line and may exchange information related to the behaviors and states of a plurality of vehicles included in the platooning line, using vehicle-to-vehicle communication. The following vehicle may join the platooning line of the leading vehicle, when finding the leading vehicle while driving. Furthermore, the following vehicle may withdraw from the platooning line while performing platooning.

With regard to the user interface of a platooning vehicle, the platooning vehicle may receive commands associated with platooning via a physical switch or button. The platooning vehicle may not provide a user interface to receive commands associated with platooning, via a display. The commands associated with the platooning may be normally required while driving, but the conventional user interface may not provide the convenience to a driver while driving.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing an apparatus and method which may provide a user interface for intuitively and simply entering commands associated with platooning, in a platooning vehicle.

The technical problems to be solved by the present inventive concept are not limited to the aforementioned problems, and any other technical problems not mentioned herein will be clearly understood from the following description by those skilled in the art to which the present invention pertains.

According to various aspects of the present invention, a user interface providing apparatus configured for platooning of a vehicle may include a touch screen display, a sensor configured for detecting an external object of the vehicle, a communication circuit communicating with an outside, and a control circuit electrically connected to the touch screen display and the sensor. The control circuit may be configured to display a first object corresponding to the vehicle and a second object corresponding to an external vehicle detected by the sensor, on the touch screen display, to receive a touch input associated with the second object, using the touch screen display, and to make a request for joining in a platooning group, to the external vehicle via the communication circuit in a response to the touch input.

According to an exemplary embodiment of the present invention, the touch input may include a long press input or two or more tap inputs to the second object.

According to an exemplary embodiment of the present invention, the touch screen display may be configured to detect pressure of the touch input, and the touch input may include a touch input to the second object, which has pressure of a specified level or more.

According to an exemplary embodiment of the present invention, the touch input may include a drag input, a pan input, a swiping input, or a flicking input in a direction facing from the first object to the second object.

According to an exemplary embodiment of the present invention, the touch input may include a pinch-in input to the first object and the second object.

According to an exemplary embodiment of the present invention, the touch input may include two tap inputs to the first object and the second object.

According to an exemplary embodiment of the present invention, the control circuit may be configured to display a guide facing from the first object to the second object on the touch screen display when the external vehicle is detected.

According to an exemplary embodiment of the present invention, the control circuit may be configured to display a guide facing from the first object to the second object on the touch screen display when the external vehicle is detected on the same lane as the vehicle.

According to an exemplary embodiment of the present invention, the control circuit may be configured to make a request for the joining to the external vehicle when the touch input is received along with the guide.

According to an exemplary embodiment of the present invention, the control circuit may be configured to control the vehicle to join in the platooning group when the request is approved by the external vehicle.

According to various aspects of the present invention, a user interface providing method for platooning of a vehicle may include displaying a first object corresponding to the vehicle and a second object corresponding to an external vehicle, receiving a touch input associated with the second object, and making a request for joining in a platooning group, to the external vehicle in a response to the touch input.

According to various aspects of the present invention, a user interface providing apparatus configured for platooning of a vehicle may include a touch screen display, a communication circuit communicating with an outside, and a control circuit electrically connected to the touch screen display and the communication circuit. The control circuit may be configured to display a first object corresponding to the vehicle and a second object corresponding to a leading vehicle included in a platooning group, on the touch screen display, to receive a touch input associated with the first object, using the touch screen display, and to make a request for withdrawing from the platooning group, to the leading vehicle via the communication circuit in a response to the touch input.

According to an exemplary embodiment of the present invention, the touch input may include a drag input, a pan input, a swiping input, or a flicking input in a direction facing from a driving lane of the vehicle to a neighboring lane of the driving lane.

According to an exemplary embodiment of the present invention, the touch input may include a drag input, a pan input, a swiping input, or a flicking input in a direction opposite to a direction facing from the first object to the second object.

According to an exemplary embodiment of the present invention, the touch input may include a long press input or two or more tap inputs to the first object.

According to an exemplary embodiment of the present invention, the touch input may include a long press input or two or more tap inputs to a region indicating a neighboring lane of a driving lane of the vehicle.

According to an exemplary embodiment of the present invention, the touch input may include a pinch-out input to the first object and the second object.

According to an exemplary embodiment of the present invention, the control circuit may be configured to display a guide facing from a region indicating a driving lane of the vehicle to a region indicating a neighboring lane of the driving lane or a guide facing a rear of the first object, on the touch screen display when two or more touch inputs to one point of the touch screen display is received.

According to an exemplary embodiment of the present invention, the control circuit may be configured to make a request for the withdrawing, to the leading vehicle when the touch input is received along with the guide.

According to an exemplary embodiment of the present invention, the control circuit may be configured to release the platooning when the request is approved by the leading vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
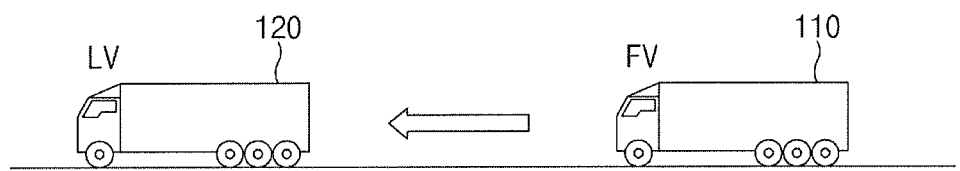
FIG. 1 is an operating environment of a user interface providing apparatus configured for platooning of a vehicle, according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, various exemplary embodiments of the present invention will be described in detail with reference to the accompanying drawings. In the drawings, the same reference numerals will be used throughout to designate the same or equivalent elements. Furthermore, a detailed description of well-known features or functions will be ruled out in order not to unnecessarily obscure the gist of the present invention.

In describing elements of exemplary embodiments of the present invention, the terms first, second, A, B, (a), (b), and the like may be used herein. These terms are only used to distinguish one element from another element, but do not limit the corresponding elements irrespective of the nature, order, or priority of the corresponding elements. Furthermore, unless otherwise defined, all terms including technical and scientific terms used herein are to be interpreted as is customary in the art to which the present invention belongs. It will be understood that terms used herein should be interpreted as having a meaning which is consistent with their meaning in the context of the present invention and the relevant art and will not be interpreted in an idealized or overly formal sense unless expressly so defined herein.

FIG. 1 is an operating environment of a user interface providing apparatus configured for platooning of a vehicle, according to an exemplary embodiment of the present invention.

Referring to FIG. 1, a vehicle 110 according to an exemplary embodiment of the present invention may be driving on a road. The vehicle 110 may drive at the rear of a leading vehicle 120 of platooning. While driving, the vehicle 110 may join the platooning group. The vehicle 110 may transmit a join request to the leading vehicle 120, in a response to the input of a driver for joining. While joining in the platooning group and then performing the platooning, the vehicle 110 may withdraw from the platooning group. The vehicle 110 may transmit a withdrawal request to the leading vehicle 120, in a response to the input of the driver for withdrawal. When the user interface for transmitting the join request and the withdrawal request is complicated, it may be difficult for the driver to enter commands while driving, and the safety may be degraded. Accordingly, the vehicle 110 may provide the driver with an intuitive and simple user interface for entering commands associated with the platooning. Hereinafter, the user interface provided by the vehicle 110 will be described in detail with reference to FIG. 2, FIG. 3, FIG. 4, FIG. 5, FIG. 6, and FIG. 7.

Figure 2:
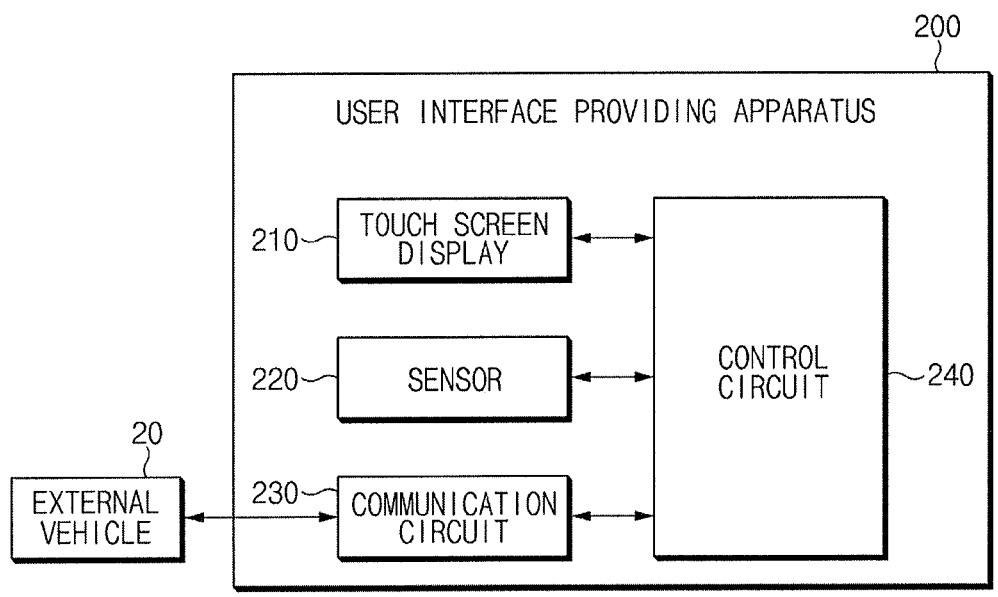
FIG. 2 is a block diagram illustrating a configuration of a user interface providing apparatus configured for platooning of a vehicle, according to an exemplary embodiment of the present invention.

FIG. 2 is a block diagram illustrating a configuration of a user interface providing apparatus configured for platooning of a vehicle, according to an exemplary embodiment of the present invention.

Referring to FIG. 2, a user interface providing apparatus 200 according to an exemplary embodiment of the present invention may include a touch screen display 210, a sensor 220, a communication circuit 230, and a control circuit 240. The user interface providing apparatus 200 may be mounted in a vehicle that supports platooning.

The touch screen display 210 may include a touch panel and a display panel. The touch screen display 210 may output a graphic user interface and may detect a touch input by a user. The touch screen display 210 may include a pressure sensor 220 and may detect the pressure by the touch input.

The sensor 220 may be configured to detect an external object of the vehicle. For example, the sensor 220 may be one of a variety of sensing apparatus, such as a camera, radar, LiDAR, or the like. The sensor 220 may detect the location, speed, acceleration, and the like of an external vehicle 20.

The communication circuit 230 may be configured to communicate with the outside. For example, the communication circuit 230 may communicate wirelessly with the external vehicle 20.

The control circuit 240 may be electrically connected to the touch screen display 210, the sensor 220, and the communication circuit 230. The control circuit 240 may control the touch screen display 210, the sensor 220 and the communication circuit 230 and may perform various data processing and calculation. The control circuit 240 may be, for example, an electronic control unit (ECU), a micro controller unit (MCU), or a sub-controller, which is mounted in the vehicle.

Hereinafter, the operation of the control circuit 240 that provides a user interface for joining in a platooning group before performing the platooning will be described in detail.

According to an exemplary embodiment of the present invention, the control circuit 240 may display a first object corresponding to the vehicle and a second object corresponding to the external vehicle 20 detected by the sensor 220, on the touch screen display 210. The control circuit 240 may detect the external vehicle 20, using the sensor 220. The control circuit 240 may display an image corresponding to a driving road, an image corresponding to the vehicle, and an image corresponding to the external vehicle 20, on the touch screen display 210. The control circuit 240 may display the first object and the second object at locations corresponding to the vehicle and the external vehicle 20, respectively.

According to an exemplary embodiment of the present invention, the control circuit 240 may receive a touch input associated with the second object, using the touch screen display 210. The control circuit 240 may recognize the user's touch input to the touch screen display 210. The control circuit 240 may receive a touch input associated with the second object indicating the external vehicle 20. The touch input associated with the second object may be implemented in various forms. For example, the touch input associated with the second object may include a long press input or two or more tap inputs to the second object. The long press input may be a touch input to the specified point, during a specific time or more. The tap input may be a touch input to the specified point, during a specific time or less. For another example, the touch input associated with the second object may include a touch input to the second object, which has a pressure of the specified level or more. For another example, the touch input associated with the second object may include a drag input, a pan input, a swiping input, or a flicking input, in the direction from the first object to the second object. Each of the drag input, the pan input, the swiping input, and the flipping input may be a touch input which is input from the first point to the second point, and may be distinguished depending on the input time, input speed, and/or input trajectory. For another example, the touch input associated with the second object may include a pinch-in input to the first object and second object. The pinch-in input may be a touch input that narrows the distance between two input points. For another example, the touch input associated with the second object may include two tap inputs to the first object and second object. When the above-described touch input is received, the control circuit 240 may determine that the touch input is associated with the second object.

According to an exemplary embodiment of the present invention, the control circuit 240 may display a guide facing from the first object to the second object, on the touch screen display 210, when an external vehicle 20 is detected. For example, the control circuit 240 may display an arrow-shaped guide from the first object to the second object. The control circuit 240 may display a guide for joining in the platooning group, when the external vehicle 20 is detected. The control circuit 240 may display a guide facing from the first object to the second object, on the touch screen display 210, when the external vehicle 20 is detected on the same lane as the lane of the vehicle. It is determined that the touch input (e.g., a long press input or tap input to the guide or a drag input, pan input, swiping input, or flicking input following the guide) to the guide is associated with the second object, when the guide is displayed. The guide will be described with reference to FIG. 4.

According to an exemplary embodiment of the present invention, the control circuit 240 may make a request for joining in the platooning group, to the external vehicle 20 via the communication circuit 230 in a response to the touch input to the second object. The control circuit 240 determines that the driver will join in the platooning group and may transmit a message for requesting joining in the platooning group, to the leading vehicle of the platooning group, when the touch input (or the touch input according to the guide) to the second object is recognized. According to an exemplary embodiment of the present invention, when the request is approved by the external vehicle 20, the control circuit 240 may control the vehicle to join in the platooning group.

As described above, a user interface that allows the driver to easily enter a platooning join request may be provided.

Hereinafter, the operation of the control circuit 240 that provides a user interface for withdrawing from a platooning group while performing the platooning will be described in detail.

According to an exemplary embodiment of the present invention, the control circuit 240 may display the first object corresponding to the vehicle and the second object corresponding to a leading vehicle included in the platooning group, on the touch screen display 210. The control circuit 240 may detect the external vehicle 20, using the sensor 220. The control circuit 240 may display an image corresponding to a driving road, an image corresponding to the vehicle, and an image corresponding to the external vehicle 20, on the touch screen display 210. The control circuit 240 may display the first object and the second object at locations corresponding to the vehicle and the external vehicle 20, respectively.

According to an exemplary embodiment of the present invention, the control circuit 240 may receive a touch input associated with the first object, using the touch screen display 210. The control circuit 240 may recognize the user's touch input to the touch screen display 210. The control circuit 240 may receive a touch input associated with the first object indicating the vehicle. The touch input associated with the first object may be implemented in various forms. For example, the touch input associated with the first object may include a drag input, a pan input, a swiping input, or a flicking input in the direction from the driving lane of the vehicle to the neighboring lane of the driving lane. For another example, the touch input associated with the first object may include a drag input, a pan input, a swiping input, or a flicking input, in the direction opposite to the direction from the first object to the second object. For another example, the touch input associated with the first object may include a long press input or two or more tap inputs to the first object. For another example, the touch input associated with the first object may include a long press input or two or more tap inputs to a region indicating a neighboring lane of the driving lane of the vehicle. For another example, the touch input associated with the first object may include a pinch-out input to the first object and second object. The pinch-out input may be a touch input that widens the distance between two input points. When the above-described touch input is received, the control circuit 240 may determine that the touch input is associated with the first object.

According to an exemplary embodiment of the present invention, when two or more touch inputs to one point of the touch screen display 210 is received, the control circuit 240 may display, on the touch screen display 210, a guide facing from the region indicating the driving lane of the vehicle to the region indicating the neighboring lane of the driving lane or a guide facing the rear of the first object. When two or more touch inputs to one point of the touch screen display 210 is received, the control circuit 240 may determine that the driver has withdrawal intent and may display a guide for withdrawing from the platooning group. It is determined that the touch input (e.g., a long press input or tap input to the guide or a drag input, pan input, swiping input, or flicking input following the guide) to the guide is associated with the first object, when the guide is displayed. The guide will be described with reference to FIG. 5.

According to an exemplary embodiment of the present invention, the control circuit 240 may make a request for the withdrawal from the platooning group, to a leading vehicle via the communication circuit 230 in a response to the touch input associated with the first object. The control circuit 240 determines that the driver will withdraw from the platooning group and may transmit a message for requesting withdrawing from the platooning group, to the leading vehicle of the platooning group, when the touch input (or the touch input according to the guide) to the first object is recognized.

According to an exemplary embodiment of the present invention, the control circuit 240 may release the platooning, when the request is approved by the external vehicle 20. The direction in which the platooning is released may be determined by the direction of the touch input to the first object. For example, the control circuit 240 may perform the lane change in the left direction after releasing the platooning, when the touch input to the left is received. For example, the control circuit 240 may perform the lane change in the right direction after releasing the platooning, when the touch input to the right is received. For example, the control circuit 240 may perform deceleration to be spaced from the preceding vehicle after releasing the platooning, when the touch input to the rear side is received.

As described above, a user interface that allows the driver to easily enter a platooning withdrawal request may be provided.

Figure 3:
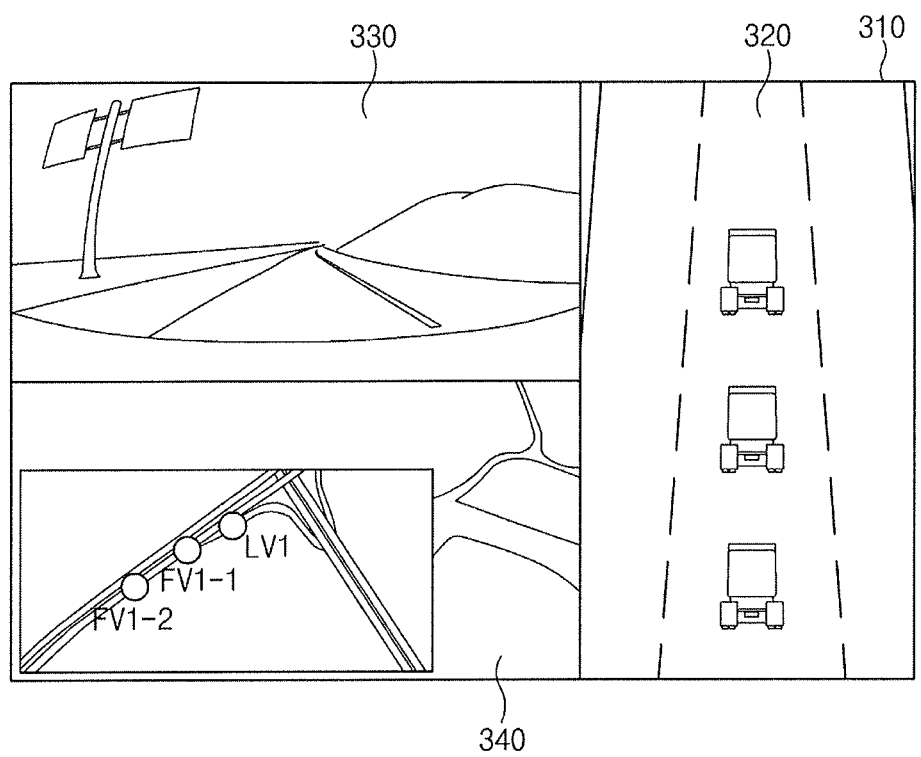
FIG. 3 is a view for describing an exemplary operation of a user interface providing apparatus configured for platooning of a vehicle, according to an exemplary embodiment of the present invention.

FIG. 3 is a view for describing an exemplary operation of a user interface providing apparatus configured for platooning of a vehicle, according to an exemplary embodiment of the present invention.

Referring to FIG. 3, a vehicle may display various images on a touch screen display 310. For example, the vehicle may display an image of the road, on which the vehicle is driving, in a first region 320, and may display objects corresponding to each of the vehicle and an external vehicle, on the road image. The objects may be displayed to correspond to current locations of the vehicle and the external vehicle. For example, the vehicle may perform platooning join or withdrawal request, based on a driver's touch input to the first region 320. For another example, the vehicle may display an external image in a second region 330. The vehicle may display an external image captured by a camera mounted in the vehicle. For another example, the vehicle may display a map image in a third region 340 and may display markers respectively corresponding to vehicles (e.g., a vehicle FV1-1, a leading vehicle LV1, another following vehicle FV1-2, and the like) included in the platooning group, on the map image. The markers may be displayed to correspond to current locations of the vehicle and the external vehicle.

Figure 4:
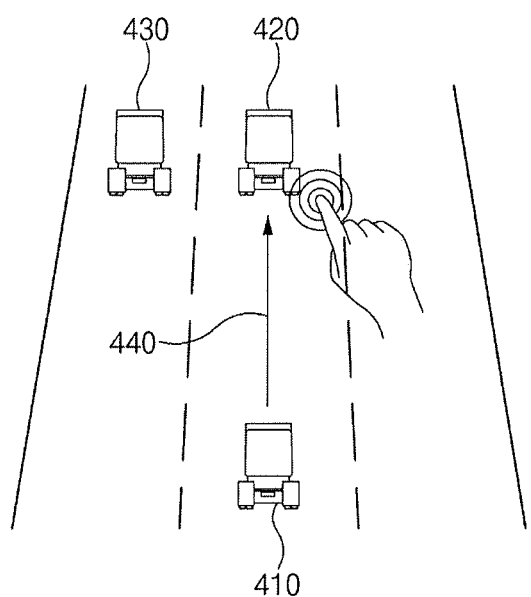
FIG. 4 is a view for describing an exemplary operation of a user interface providing apparatus configured for platooning of a vehicle, according to an exemplary embodiment of the present invention.

FIG. 4 is a view for describing an exemplary operation of a user interface providing apparatus configured for platooning of a vehicle, according to an exemplary embodiment of the present invention.

Referring to FIG. 4, a vehicle according to an exemplary embodiment of the present invention may display a first object 410 corresponding to the vehicle, a second object 420 corresponding to a first external vehicle, and a third object 430 corresponding to a second external vehicle, on a touch screen display. For example, the vehicle may display an external vehicle located within a specified distance from the vehicle. The vehicle may display the first object 410, the second object 420, and the third object 430 at points corresponding to the locations of the vehicle, the first external vehicle, and the second external vehicle, respectively. For example, the first external vehicle and the second external vehicle may be the leading vehicle of platooning.

The vehicle may display a guide 440 facing from the first object 410 to the second object 420, when the vehicle and the first external vehicle are located within the same lane. For example, the guide 440 may be displayed in a form of an arrow. The driver may perform a touch input associated with the second object 420 to transmit a join request to the first external vehicle. For example, the vehicle may receive a drag input that follows the guide. The vehicle may make a request for join, to the first external vehicle, when the touch input associated with the second object 420 is received. The driver may easily grasp the location of the leading vehicle and may make a request for joining in the platooning, to the leading vehicle through an intuitive input, by providing the above-described user interface.

Figure 5:
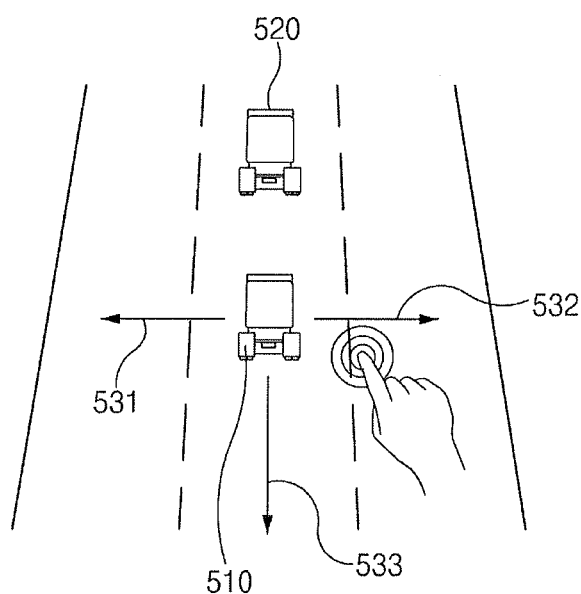
FIG. 5 is a view for describing an exemplary operation of a user interface providing apparatus configured for platooning of a vehicle, according to an exemplary embodiment of the present invention.

FIG. 5 is a view for describing an exemplary operation of a user interface providing apparatus configured for platooning of a vehicle, according to an exemplary embodiment of the present invention.

Referring to FIG. 5, a vehicle according to an exemplary embodiment of the present invention may display a first object 510 corresponding to the vehicle and a second object 520 corresponding to an external vehicle, on a touch screen display. For example, the vehicle may display an external vehicle included in the platooning group. The vehicle may display the first object 510 and the second object 520 at points corresponding to the locations of the vehicle and the external vehicle, respectively. For example, the external vehicle may be the leading vehicle of platooning.

The vehicle may display guides 531, 532, and 533 facing from the first object 510 to the left, the right, and the rear, when an input (e.g., two or more inputs to one point of a touch screen display) indicating a withdrawal intent is received from the driver or continuously during platooning. For example, the guides 531, 532, and 533 may be displayed in a form of an arrow. The driver may perform a touch input associated with the first object 510 to transmit a withdrawal request to the external vehicle. For example, the vehicle may receive a drag input that follows the first guide 531, the second guide 532, or the third guide 533. The vehicle may make a request for withdrawal, to an external vehicle, when the touch input associated with the first object 510 is received.

The vehicle may perform control for withdrawal depending on the pattern of the touch input, when the withdrawal is approved by the external vehicle. For example, the vehicle may perform a lane change to the left lane after the withdrawal, when a drag input following the first guide 531 is received. For another example, the vehicle may perform a lane change to the right lane after the withdrawal, when a drag input following the second guide 532 is received. For another example, the vehicle may perform deceleration to be spaced from the leading vehicle after withdrawal, when a drag input following the third guide 533 is received. The driver may make a request for withdrawal to the leading vehicle through an intuitive input and may easily set the control direction after the withdrawal, by providing the above-described user interface.

Figure 6:
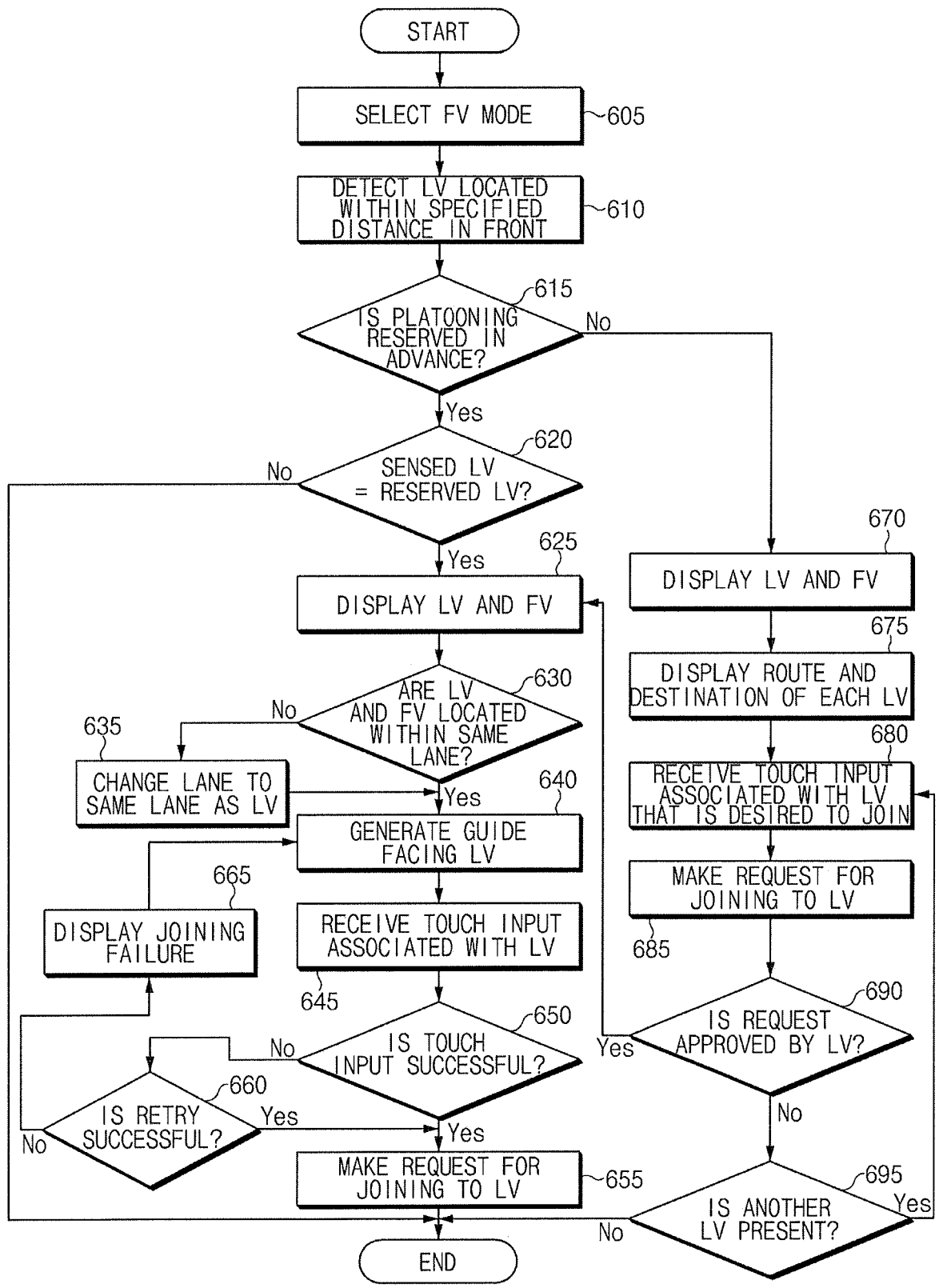
FIG. 6 is a flowchart for describing a user interface providing method for platooning of a vehicle.

FIG. 6 is a flowchart for describing a user interface providing method for platooning of a vehicle.

Hereinafter, it is assumed that a vehicle including the user interface providing apparatus 200 of FIG. 2 performs the process of FIG. 6. Furthermore, in a description of FIG. 6, it may be understood that an operation referred to as being performed by a vehicle is controlled by the control circuit 240 of the user interface providing apparatus 200.

Referring to FIG. 6, in operation 605, the vehicle may select a following vehicle (FV) mode and may drive in the FV mode. In operation 610, the vehicle may detect a leading vehicle (LV) located within a specified distance in front, over V2V communication. In operation 615, the vehicle may determine whether platooning is reserved in advance.

When the platooning is reserved in advance, in operation 620, the vehicle may determine whether the detected LV corresponds to a reserved LV. When the detected LV corresponds to the reserved LV, in operation 625, the vehicle may display objects respectively corresponding to the LV and FV (vehicle itself) on a screen. In operation 630, the vehicle may determine whether the LV and the FV are located within the same lane. When the LV and the FV are located in different lanes, in operation 635, the vehicle may perform a lane change to the same lane as the lane of the LV. When the LV and the FV are located in the same lane, in operation 640, the vehicle may generate a guide facing the LV. The vehicle may activate a driving assistance system that supports lane keeping, speed keeping, and interval keeping. In operation 645, the vehicle may receive the touch input associated with the LV. In operation 650, the vehicle may determine whether the touch input associated with the LV is successful. When the touch input is successful, in operation 655, the vehicle may make a request for joining in the platooning, to the LV. When the touch input fails, in operation 660, the vehicle may receive the touch input again and may determine whether the retry is successful. When the retry fails, in operation 665, the vehicle may display a joining failure and may return to operation 640.

When the platooning is not reserved in advance, in operation 670, the vehicle may display objects respectively corresponding to the LV and FV, on the screen. In operation 675, the vehicle may display the route and destination of each LV on the screen. In operation 680, the vehicle may receive the touch input associated with the LV in which a driver desires to join. In operation 685, the vehicle may make a request for joining, to the LV. In operation 690, the vehicle may determine whether the request is approved by the LV. When the request is approved, the vehicle may proceed to operation 625. When the request is not approved, in operation 695, the vehicle may determine whether another LV is present. When another LV is present, the vehicle may proceed to operation 680.

Figure 7:
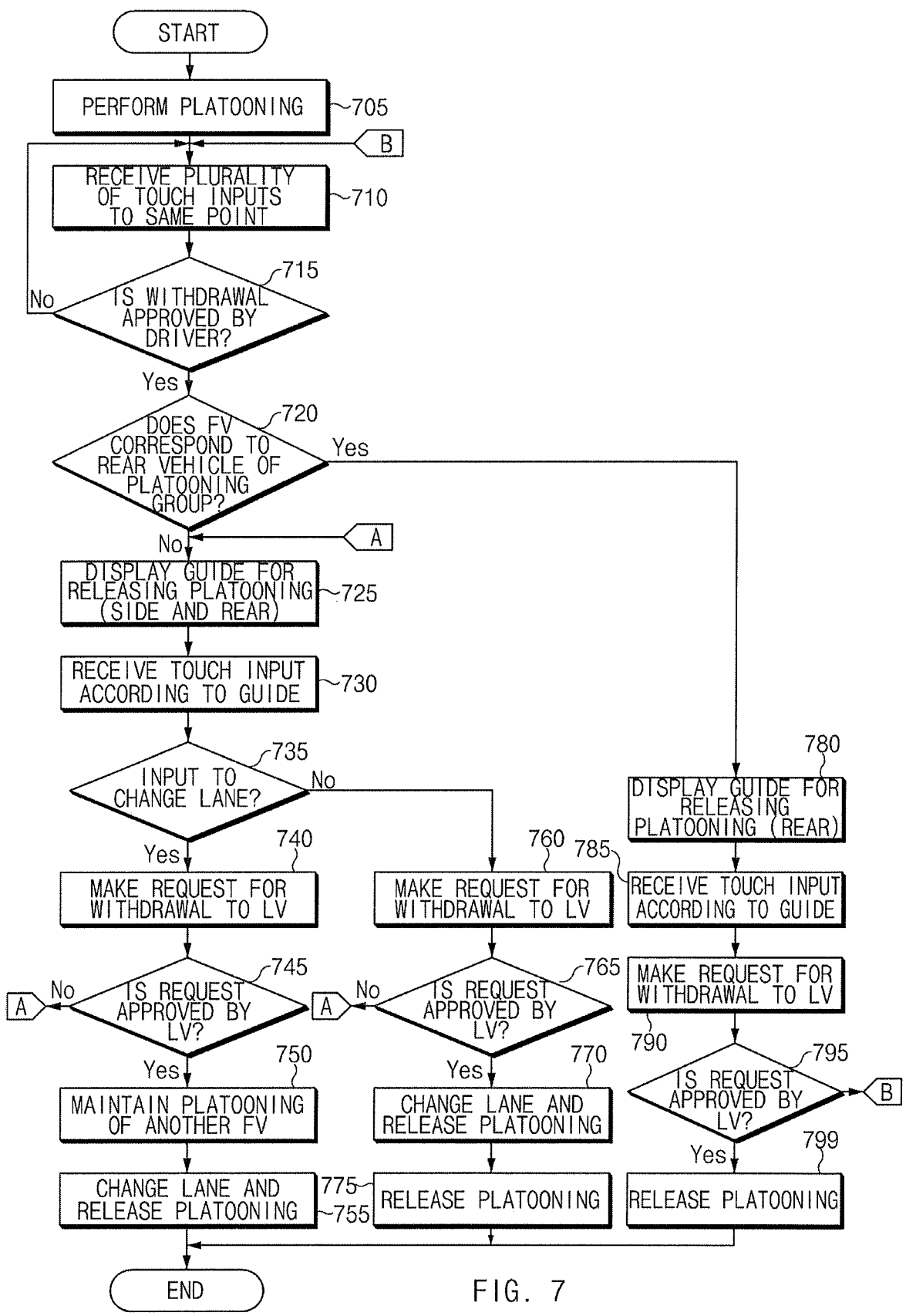
FIG. 7 is a flowchart for describing a user interface providing method for platooning of a vehicle.

FIG. 7 is a flowchart for describing a user interface providing method for platooning of a vehicle.

Hereinafter, it is assumed that a vehicle including the user interface providing apparatus 200 of FIG. 2 performs the process of FIG. 7. Furthermore, in a description of FIG. 7, it may be understood that an operation referred to as being performed by a vehicle is controlled by the control circuit 240 of the user interface providing apparatus 200.

Referring to FIG. 7, in operation 705, the vehicle may perform platooning. In operation 710, the vehicle may receive a plurality of touch inputs to the same point, from a driver. The plurality of touch inputs may indicate the driver's release intent. In operation 715, the vehicle may output a message for the approval of the driver and may receive the approval of withdrawal, from the driver. When the withdrawal is approved, in operation 720, the vehicle may determine whether the FV (the vehicle itself) corresponds to the rear vehicle of the platooning group.

When the FV does not correspond to the rear vehicle, in operation 725, the vehicle may display a guide for releasing the platooning. The guide may include a guide indicating the side and a guide indicating the rear. In operation 730, the vehicle may receive a touch input according to the guide. In operation 735, the vehicle may determine whether the received touch input corresponds to an input (e.g., an input according to a guide indicating the side) to change a lane. When the touch input corresponds to an input to change a lane, in operation 740, the vehicle may make a request for withdrawal to the LV. In operation 745, the vehicle may determine whether the request is approved by the LV. When the request is approved, in operation 750, another FV may maintain the platooning; in operation 755, the vehicle may perform lane change depending on the direction of the touch input and may release the platooning.

When the touch input does not correspond to an input to change a lane, in operation 760, the vehicle may make a request for withdrawal to the LV. In operation 765, the vehicle may determine whether the request is approved by the LV. When the request is approved, in operation 770, another FV may release the platooning such that the vehicle is spaced from the LV; in operation 775, the vehicle may release the platooning within a driving lane.

When the FV corresponds to the rear vehicle, in operation 780, the vehicle may display a guide for releasing the platooning. Because the rear vehicle does not need the lane change for releasing the platooning, the guide may be a guide indicating the rear. In operation 785, the vehicle may receive a touch input according to the guide. In operation 790, the vehicle may make a request for withdrawal, to the LV. In operation 795, the vehicle may determine whether the request is approved by the LV. When the request is approved, in operation 799, the vehicle may release the platooning within the driving lane.

Figure 8:
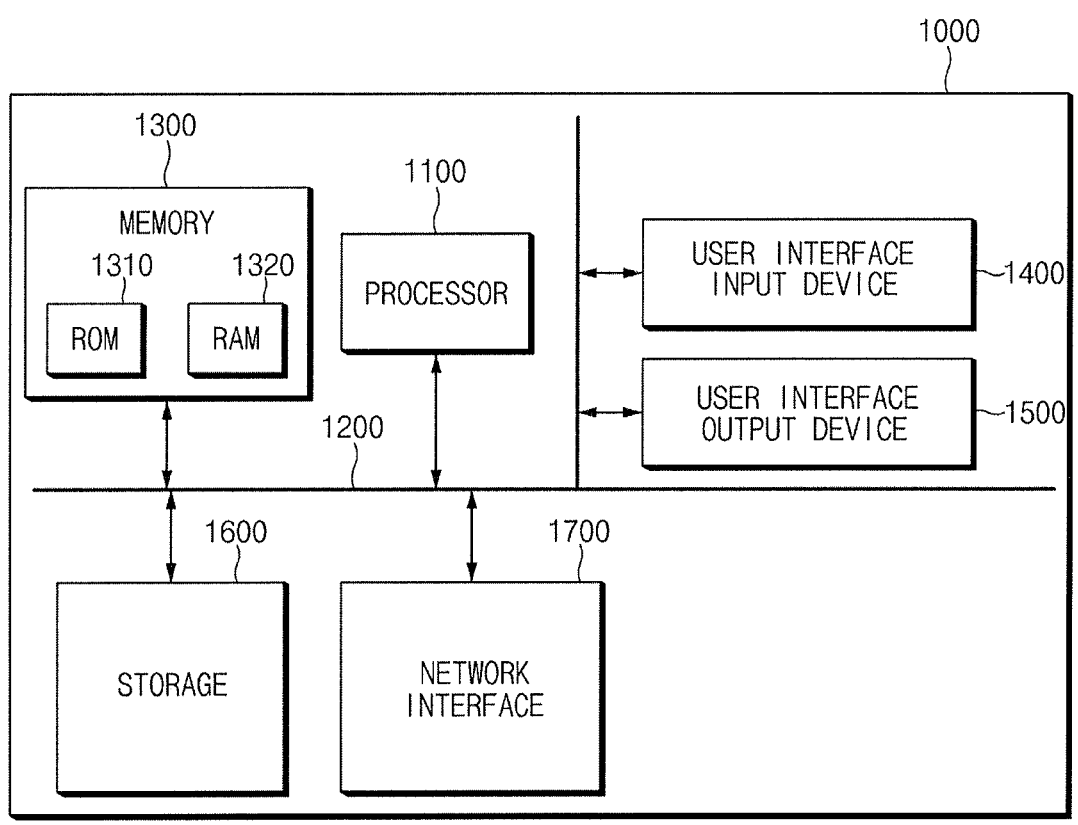
FIG. 8 illustrates a determining system according to an exemplary embodiment of the present invention.

FIG. 8 illustrates a computing system according to an exemplary embodiment of the present invention.

Referring to FIG. 8, a method according to an exemplary embodiment of the present invention may be implemented through a computing system. A computing system 1000 may include at least one processor 1100, a memory 1300, a user interface input device 1400, a user interface output device 1500, storage 1600, and a network interface 1700, which are connected to each other through a system bus 1200.

The processor 1100 may be a central processing unit (CPU) or a semiconductor device that processes instructions stored in the memory 1300 and/or the storage 1600. Each of the memory 1300 and the storage 1600 may include various types of volatile or nonvolatile storage media. For example, the memory 1300 may include a read only memory (ROM) and a random access memory (RAM).

Accordingly, the operations of the method or algorithm described in connection with the exemplary embodiments included in the specification may be directly implemented with a hardware module, a software module, or a combination of the hardware module and the software module, which is executed by the processor 1100. The software module may reside on a storage medium (i.e., the memory 1300 and/or the storage 1600) such as a random access memory (RAM), a flash memory, a read only memory (ROM), an erasable and programmable ROM (EPROM), an electrically EPROM (EEPROM), a register, a hard disk drive, a removable disc, or a compact disc-ROM (CD-ROM). The exemplary storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and storage medium may be implemented with separate components in the user terminal.

Hereinabove, although the present invention has been described with reference to exemplary embodiments and the accompanying drawings, the present invention is not limited thereto, but may be variously modified and altered by those skilled in the art to which the present invention pertains without departing from the spirit and scope of the present invention claimed in the following claims.

Therefore, embodiments of the present invention are not intended to limit the technical spirit of the present invention, but provided only for the illustrative purpose. The scope of protection of the present invention should be construed by the attached claims, and all equivalents thereof should be construed as being included within the scope of the present invention.

The present invention may perform an operation associated with joining or withdrawing in or from platooning based on a touch input associated with an object corresponding to a leading vehicle, providing an intuitive and simple user interface to a driver of the platooning vehicle.

Besides, a variety of effects directly or indirectly understood through the present disclosure may be provided.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A user interface providing apparatus for platooning of a vehicle, the apparatus comprising:
   a touch screen display;
   a sensor configured to detect an external object of the vehicle;
   a communication circuit configured to communicate with an outside thereof; and
   a controller electrically connected to the touch screen display, the sensor and the communication circuit,
   wherein the controller is configured to:
      display a first object corresponding to the vehicle and a second object corresponding to an external vehicle detected by the sensor with an image of a road, on the touch screen display;
      receive a touch input associated with the second object, using the touch screen display; and
      make a request for joining in a platooning group, to the external vehicle via the communication circuit in a response to the touch input, and
   wherein when the request is approved by the external vehicle, the controller is configured to control the vehicle to join in the platooning group, and
   wherein when the external vehicle is detected, the controller is configured to display a guide facing from the first object to the second object on the touch screen display.

2. The apparatus of claim 1,
   wherein the touch input includes a press input made during a predetermined time period or at least two tap inputs to the second object.

3. The apparatus of claim 1,
wherein the touch screen display is configured to detect pressure of the touch input, and
wherein the touch input includes a touch input to the second object, which has pressure of a predetermined level or more.

4. The apparatus of claim 1,
wherein the touch input includes a drag input, a pan input, a swiping input, or a flicking input in a direction facing from the first object to the second object.

5. The apparatus of claim 1,
wherein the touch input includes a pinch-in input to the first object and the second object.

6. The apparatus of claim 1,
wherein the touch input includes two tap inputs to the first object and the second object.

7. The apparatus of claim 1,
wherein when the external vehicle is detected on a same lane as the vehicle, the controller is configured to display the guide facing from the first object to the second object on the touch screen display.

8. The apparatus of claim 7,
wherein when the touch input is received along with the guide, the controller is configured to make the request for the joining to the external vehicle.

9. A user interface providing method of platooning of a vehicle, the method comprising:
displaying, by a controller, a first object corresponding to the vehicle and a second object corresponding to an external vehicle with an image of a road;
receiving, by the controller, a touch input associated with the second object;
making, by the controller, a request for joining in a platooning group, to the external vehicle in a response to the touch input; and
controlling, by the controller, when the request is approved by the external vehicle, the vehicle to join in the platooning group,
wherein when the external vehicle is detected, displaying, by the controller, a guide facing from the first object to the second object on the touch screen display.

10. A user interface providing apparatus for platooning of a vehicle, the apparatus comprising:
a touch screen display;
a communication circuit configured to communicate with an outside thereof; and
a controller electrically connected to the touch screen display and the communication circuit,
wherein the controller is configured to:
  display a first object corresponding to the vehicle and a second object corresponding to a leading vehicle included in a platooning group with an image of a road, on the touch screen display;
  receive a touch input associated with the first object, using the touch screen display; and
  make a request for withdrawing from the platooning group, to the leading vehicle via the communication circuit in a response to the touch input, and
wherein when the request is approved by the leading vehicle, the controller is configured to release the platooning, and
wherein when at least two touch inputs to one point of the touch screen display is received, the controller is configured to display a guide facing from a region indicating a driving lane of the vehicle to a region indicating an adjacent lane of the driving lane or a guide facing a rear of the first object, on the touch screen display.

11. The apparatus of claim 10,
wherein the touch input includes a drag input, a pan input, a swiping input, or a flicking input in a direction facing from a driving lane of the vehicle to an adjacent lane of the driving lane.

12. The apparatus of claim 10,
wherein the touch input includes a drag input, a pan input, a swiping input, or a flicking input in a direction opposite to a direction facing from the first object to the second object.

13. The apparatus of claim 10,
wherein the touch input includes a press input made during a predetermined time period or at least two tap inputs to the first object.

14. The apparatus of claim 10,
wherein the touch input includes a press input made during a predetermined time period or at least two tap inputs to a region indicating an adjacent lane of a driving lane of the vehicle.

15. The apparatus of claim 10,
wherein the touch input includes a pinch-out input to the first object and the second object.

16. The apparatus of claim 10,
wherein when the touch input is received along with the guide, the controller is configured to make the request for the withdrawing, to the leading vehicle.

\* \* \* \* \*